United States Patent Office 3,267,156
Patented August 16, 1966

3,267,156
PRODUCTION OF DIALKYL ETHERS
Waldemar H. Hansen, West Deptford Township, Gloucester County, N.J., assignor to Socony Mobil Oil Company, Inc., a corporation of New York
No Drawing. Filed Aug. 7, 1961, Ser. No. 129,512
2 Claims. (Cl. 260—614)

This invention relates to the manufacture of ethers. It is more particularly concerned with a process for producing dialkyl ethers by the dehydration of alcohols.

As is well known to those familiar with the art, ethers have been produced by hydrating olefins and by the dehydration of alcohols. It has been proposed to carry out the dehydration reaction in the presence of sulfuric acid. This method, however, requires expensive facilities for handling corrosive materials. It has also been proposed to dehydrate alcohols to ethers in the presence of refractory metal oxide catalysts, such as alumina. This type of operation requires relatively high temperature. Therefore, substantial amounts of the alcohol charge are decomposed into olefin and water.

In the production of ethers by hydration of olefins, solid inorganic catalysts have been proposed. These catalysts include silica-alumina, phosphoric acid on a clay support, tungsten oxide, etc. In general, such catalysts have been lacking in activity and in selectivity. The acidic ion exchange resins have been found to be more active for hydrating olefins to ethers. These resins become deactivated because of polymerization and condensation of impurities, such as allene, methyl acetylene, oxygenated hydrocarbons, etc. which are present in the hydrocarbon feed. As the resin catalysts are not easily regenerable, the useful life of the catalyst is shortened.

It has now been found that ethers can be produced by a method that is simple and commercially feasible. It has been discovered that alcohols can be dehydrated selectively to ethers, with minimum decomposition of alcohol to water and propylene, in the presence of acidic ion exchange resin catalysts. It has further been discovered that ethers can be produced efficiently from olefins by a two-step process wherein olefins are hydrated to alcohols in the presence of an inorganic catalyst in the first step, and then the alcohols are dehydrated to ethers, in the second step, in the presence of acidic ion exchange resin catalysts.

Accordingly, it is an object of this invention to provide a process for producing ethers. Another object is to provide a process for producing ethers, wherein the useful catalyst life of acidic ion exchange catalysts is increased. A specific object is to provide a process for dehydrating alcohols into ethers in the presence of acidic ion exchange resin catalysts. Another specific object is to provide a two-step process wherein olefins are hydrated to alcohols and then the alcohols are dehydrated to ethers. Other objects and advantages of this invention will become apparent to those skilled in the art, from the following detailed description.

In general, this invention provides a process for producing ethers that comprises contacting a substantially anhydrous alcohol with an acidic ion exchange catalyst, in the absence of added water and olefin, at a temperature varying between about 250° F. and about 400° F., under a pressure varying between about 500 p.s.i.g. and about 1500 p.s.i.g., and at a liquid hourly space velocity varying between about 0.1 and about 4.

Another embodiment of this invention provides a two-step process for producing ethers from olefins that comprises contacting an olefin and water with a solid, refractory inorganic hydration catalyst at a temeprature varying between about 350° F. and about 750° F., at an olefin partial pressure varying between about 500 p.s.i.g. and about 3000 p.s.i.g., using an olefin liquid hourly space velocity varying between about 0.3 and about 2, and using a molar ratio of water to olefin varying between about 1 and about 50; separating an alcohol product; and contacting said alcohol in a substantially anhydrous state with an acidic ion exchange resin catalyst, in the absence of added water and olefin, at a temperature varying between about 250° F. and about 400° F., under a pressure varying between about 500 p.s.i.g. and about 1500 p.s.i.g., and at a liquid hourly space velocity varying between about 0.1 and about 4.

The alcohol reactant for the dehydration of alcohol to ether is an alkanol having between 2 and 5 carbon atoms, inclusive. The alcohol reactant can be straight chained or branched chained. It is further contemplated to use mixtures of alcohols, which can include straight and branched chained alcohols or alcohols or varying chain length, or both. Non-limiting examples of the alcohols are ethanol, propanol, isopropanol, butanol, isobutanol, pentanol, and isopentanol. With respect to the dehydration of alcohol to ether, as a process by itself, the source of the alcohol reactant is not a determinant factor. Thus, the alcohol reactant, in this respect, can be derived from any source, including commercial sources and synthesis by any of the means well known in the art. With regard to an embodiment of the present process, however, that features a two-step process of first hydrating an olefin to alcohol and dehydrating the alcohol to ether, the source of the alcohol reactant is important to the over-all process. The method for preparing alcohols by hydration of olefins is discussed hereinafter.

However, with specific regard to the dehydration of alcohol, the catalyst found utilizable are the acidic organic ion exchange resins. These resins are in the acid form and contain free sulfonic, sulfuric, phosphoric, or phosphonic acid groups. The ion exchange resins contemplated herein are synthetic aryl resins, having essentially a hydrocarbon skeleton, combined with strong mineral acid groups. The strong mineral acid groups can be put into the aryl olefin monomer before it is polymerized, or the mineral acid groups can be put into the material after the polymerization.

Suitable resins include solid sulfonated cross-linked polymers of styrene that contains between about 6 percent and about 15 percent divinyl benzene. Such resins can be produced as described in United States Letters Patent No. 2,366,007. Further description of the preparation of acidic organic ion exchange resins and their use in hydrating olefins to alcohols and ethers can be found in United States Letters Patent No. 2,813,908.

The dehydration of alcohol to ether, in the presence of acidic organic ion exchange resins, is carried out at temperatures varying between about 250° F. and about 400° F., and preferably between about 250° F. and about 300° F. The pressure will be super atmospheric, i.e., between about 100 pounds per square inch gauge (p.s.i.g.)

and about 1500 p.s.i.g., and preferably between about 500 and about 1000 p.s.i.g. The LHSV (alcohol liquid volume per volume of catalyst per hour) will vary between about 0.3 and about 4, preferably between about 0.3 and about one.

The process of dehydration can be carried out batchwise or in a continuous process. The major products are ether, unreacted alcohol, and water. The alcohol when dried can be recycled.

As was mentioned hereinbefore, a two-step process is contemplated. In such a process, the first step involves the hydration of olefins to alcohols, followed by the second step of dehydrating the alcohol thus-produced to an ether, as aforedescribed.

The olefin feed to the hydration step is a monoolefin containing between 2 and 5 carbon atoms. The olefin reactant can be relatively pure, or mixtures of olefins. It is also contemplated to use mixtures of olefins with the corresponding saturated hydrocarbon, such as propane-propylene, ethane-ethylene, and butane-butylene cuts. Non-limiting examples of the olefin reactant are ethylene, propylene, butylene, isobutylene, and amylene.

The refractory inorganic hydration catalysts are well known in the art. These include composites of silica and alumina, alumina impregnated with aluminum sulfate, phosphoric acid on clay, and tungsten oxide. A preferred catalyst herein is comprised of 75 weight percent silica and 25 weight percent alumina.

As those familiar with the art will readily appreciate, the operating conditions for the hydration step will vary depending upon the particular olefin and catalyst used. In general, over a heterogeneous solid catalyst, the hydration will be carried out at temperatures varying between about 350° F. and about 750° F., and preferably at about 450° F. The mole ratio of water to olefin is between about 1 and about 50, preferably about 35. The olefin partial pressure is between about 500 and about 3,000 pounds per square inch gauge (p.s.i.g.) and preferably between about 1,000 and about 1,500 p.s.i.g. The olefin LHSV (liquid volume per volume catalyst per hour) will vary between about 0.3 and about 2, and preferably between about 0.3 and about 0.5. This reaction can be carried out batchwise, but a continuous process is preferred.

The alcohol can be separated from water by a two column azeotropic distillation using product ether as separating agent in the second distillation column. The alcohol can be dried with calcium chloride, molecular sieve, or using other conventional means.

DEHYDRATION TO ETHER

Examples 1 and 2

Two dehydration runs were made using an alcohol feed at an LHSV of 0.26 and one of 0.52. Each run was carried out in a 100-cc. tubular type stainless steel reactor containing Dowex 50W-X8 ion exchange resin catalyst. Dowex 50W-X8 resin is a commercially available strongly acidic cation exchange resin made by Dow Chemical Company. It is a sulfonated copolymer of styrene and divinylbenzene containing 8% divinylbenzene as crosslinking agent. The Dowex resin has an acidity of about 5 milliequivalents/gram. At each space velocity, 99.9% isopropyl alcohol was contacted with the catalyst at 300° F. and under a pressure of 500 p.s.i.g. Results are set forth in Table I.

TABLE I

| Example | 1 | 2 |
|---|---|---|
| Alcohol LHSV | 0.26 | 0.52 |
| Liquid Product Composition, percent: | | |
| Diisopropyl ether | 32.6 | 25.3 |
| Isopropyl alcohol | 54.3 | 60.4 |
| Water | 13.1 | 14.3 |
| Isopropyl alcohol conversion, percent | 32.6 | 24.6 |

Examples 3 through 6

In order to show the effect of temperature, runs were made as described in Examples 1 and 2, except that the temperature was varied. In each run the pressure was 500 p.s.i.g. and the LHSV was 0.5. Pertinent data for these runs on isopropyl alcohol are set forth in Table II.

TABLE II

| Example | 3 | 4 | 5 | 6 |
|---|---|---|---|---|
| Temperature, °F | 250 | 300 | 350 | 400 |
| Liquid Prod. Comp., percent: | | | | |
| Diisopropyl ether | 16.6 | 25.3 | 8.2 | 4.0 |
| Isopropyl alcohol | 78.6 | 60.4 | 73.5 | 72.2 |
| Water | 4.8 | 14.3 | 18.3 | 23.8 |
| Isopropyl alcohol conv., percent | 18.7 | 24.2 | 6.9 | 3.0 |

It will be noted from the data in Tables I and II that an alcohol can readily be converted into an ether by contacting it with an acidic organic ion exchange resin. Better yields are obtained at 250–300° F. (Examples 3 and 4), but these can be increased by lowering LHSV (Example 1). In any case, the unconverted alcohol can be recovered, dried, and recycled.

In another embodiment of this invention, an olefin can be hydrated to form the corresponding alcohol, which can be converted to the ether as aforedescribed. This is illustrated in the following examples.

Examples 7 through 9

A tubular type stainless steel reactor was charged with a silica-alumina catalyst containing 25 weight percent $Al_2O_3$. In a series of runs, each at a different temperature, propylene and water were contacted with the catalyst. Each run was carried out at an LHSV of 0.3 at 1,500 p.s.i.g. pressure. The molar ratio of water to propylene was 35. Pertinent data are set forth in Table III.

TABLE III

| Example | Temp., °F. | Percent Propylene Conv. to Isopropanol | Percent Isopropanol in aqueous product |
|---|---|---|---|
| 1 | 400 | 13 | 1.2 |
| 2 | 450 | 59 | 5.4 |
| 3 | 500 | 19 | 1.8 |

The alcohol produced in these runs is separated from the water, dried and charged to the ion exchange catalyst to produce the ether. Unconverted olefin and water can be recycled, with make-up olefin.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for producing ethers that comprises contacting a substantially anhydrous alcohol having between 2 and 5 carbon atoms, inclusive, with a sulfonated resin copolymer of styrene and divinylbenzene containing between about 6 perecnt and about 15 percent divinylbenzene cross-linking agent, in the absence of added water and olefin, at a temperature varying between about 250° F. and about 400° F., under a pressure varying between about 500 p.s.i.g. and about 1500 p.s.i.g., and at a liquid hourly space velocity varying between about 0.1 and about 4.

2. A process for producing diisopropyl ether that comprises contacting substantially anhydrous isopropanol with a sulfonated resin copolymer of styrene and divinylbenzene containing between about 6 percent and about 15 percent divinylbenzene cross-linking agent, in the absence of added water and olefin, at a temperature varying between about 250° F. and about 300° F., under a pressure varying between about 500 p.s.i.g. and about 1000 p.s.i.g., and at a liquid hourly space velocity varying between about 0.3 and about one.

References Cited by the Examiner

UNITED STATES PATENTS

| 2,746,738 | 5/1956 | Ehm et al. | 260—614 X |
| 2,845,463 | 7/1958 | Friedman et al. | 260—614 |

OTHER REFERENCES

Brewster, Organic Chemistry, 2nd ed. (1953), 62–64, 132–134 (1953).

LEON ZITVER, *Primary Examiner.*

LORRAINE A. WEINBERGER, *Examiner.*

B. HELFIN, *Assistant Examiner.*